(12) United States Patent
Chun et al.

(10) Patent No.: US 8,906,511 B2
(45) Date of Patent: *Dec. 9, 2014

(54) ALUMINA FORMING BIMETALLIC TUBE AND METHOD OF MAKING AND USING

(75) Inventors: ChangMin Chun, Annandale, NJ (US); D. Samuel Deutsch, Flemington, NJ (US); James E. Feather, Fairfax, VA (US); Jeffrey P. Jones, Houston, TX (US); David B. Spicer, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 302 days.

This patent is subject to a terminal disclaimer.

(21) Appl. No.: 13/271,808

(22) Filed: Oct. 12, 2011

(65) Prior Publication Data

US 2012/0097289 A1    Apr. 26, 2012

Related U.S. Application Data

(60) Provisional application No. 61/405,407, filed on Oct. 21, 2010.

(51) Int. Cl.
*F16L 9/147* (2006.01)
*B05D 3/06* (2006.01)
(Continued)

(52) U.S. Cl.
CPC . *F16L 9/02* (2013.01); *B22F 5/106* (2013.01); *B22F 7/06* (2013.01); *B32B 15/011* (2013.01); *B32B 15/013* (2013.01); *B32B 15/015* (2013.01); *C22C 19/05* (2013.01); *C22C 19/058* (2013.01); *C22C 30/00* (2013.01); *C22C 38/02* (2013.01); *C22C 38/04* (2013.01); *C22C 38/06* (2013.01); *C22C 38/40* (2013.01); *C22C 38/48* (2013.01); *F28F 19/06* (2013.01); *F28F 21/083* (2013.01); *C22C 1/0433* (2013.01); *F28D 2021/0059* (2013.01)
USPC ...... 428/469; 219/121.46; 138/142; 138/177; 427/576; 427/554; 427/532

(58) Field of Classification Search
None
See application file for complete search history.

(56) References Cited

U.S. PATENT DOCUMENTS

| 4,679,294 A | 7/1987 | Lomax et al. |
| 2003/0054101 A1 * | 3/2003 | Lee et al. ................. 427/255.28 |

(Continued)

FOREIGN PATENT DOCUMENTS

WO    WO 2009152134 A1 * 12/2009    .............. C23C 30/00

OTHER PUBLICATIONS

Tillack et al. Tech. Series Bulletin, No. 10071, 1998, p. 1-16.*

(Continued)

*Primary Examiner* — Vera Katz
(74) *Attorney, Agent, or Firm* — Robert A. Migiorini

(57) ABSTRACT

Provided is a bimetallic tube for transport of hydrocarbon feedstocks in a petrochemical process unit and/or refinery process unit, including: i) an outer tube layer being formed from a steam cracker alloy including at least 18.0 wt. % Cr and at least 10.0 wt. % Ni; ii) an inner tube layer being formed from an alumina forming bulk alloy including 5.0 to 10.0 wt. % of Al, 18.0 wt. % to 25.0 wt. % Cr, less than 0.5 wt. % Si, and at least 35.0 wt. % Fe with the balance being Ni, wherein the inner tube layer is formed plasma powder welding the alumina forming bulk alloy on the inner surface of the outer tube layer; and iii) an oxide layer formed on the surface of the inner tube layer, wherein the oxide layer is substantially comprised of alumina, chromia, silica, mullite, spinels, or mixtures thereof.

22 Claims, 1 Drawing Sheet

(51) Int. Cl.

| | |
|---|---|
| *B05D 3/10* | (2006.01) |
| *B05D 3/14* | (2006.01) |
| *B05D 3/12* | (2006.01) |
| *C23C 26/00* | (2006.01) |
| *H05H 1/24* | (2006.01) |
| *F16L 9/02* | (2006.01) |
| *B22F 5/10* | (2006.01) |
| *B22F 7/06* | (2006.01) |
| *B32B 15/01* | (2006.01) |
| *C22C 19/05* | (2006.01) |
| *C22C 30/00* | (2006.01) |
| *C22C 38/02* | (2006.01) |
| *C22C 38/04* | (2006.01) |
| *C22C 38/06* | (2006.01) |
| *C22C 38/40* | (2006.01) |
| *C22C 38/48* | (2006.01) |
| *F28F 19/06* | (2006.01) |
| *F28F 21/08* | (2006.01) |
| *C22C 1/04* | (2006.01) |
| *F28D 21/00* | (2006.01) |

(56) References Cited

U.S. PATENT DOCUMENTS

| | | |
|---|---|---|
| 2003/0192680 A1 | 10/2003 | Blanda, Jr. et al. |
| 2007/0144631 A1* | 6/2007 | Clavenna et al. ............. 148/558 |
| 2007/0158054 A1* | 7/2007 | Greaney et al. ............... 165/133 |
| 2007/0187078 A1* | 8/2007 | Greaney et al. ............... 165/158 |
| 2010/0015564 A1 | 1/2010 | Chun et al. |
| 2012/0211400 A1* | 8/2012 | Chun et al. ...................... 208/47 |
| 2012/0246935 A1* | 10/2012 | Greaney et al. .......... 29/890.031 |

OTHER PUBLICATIONS

Balaji et al. Scripta Materialia, 56, 2007, 1063-1066.*

* cited by examiner

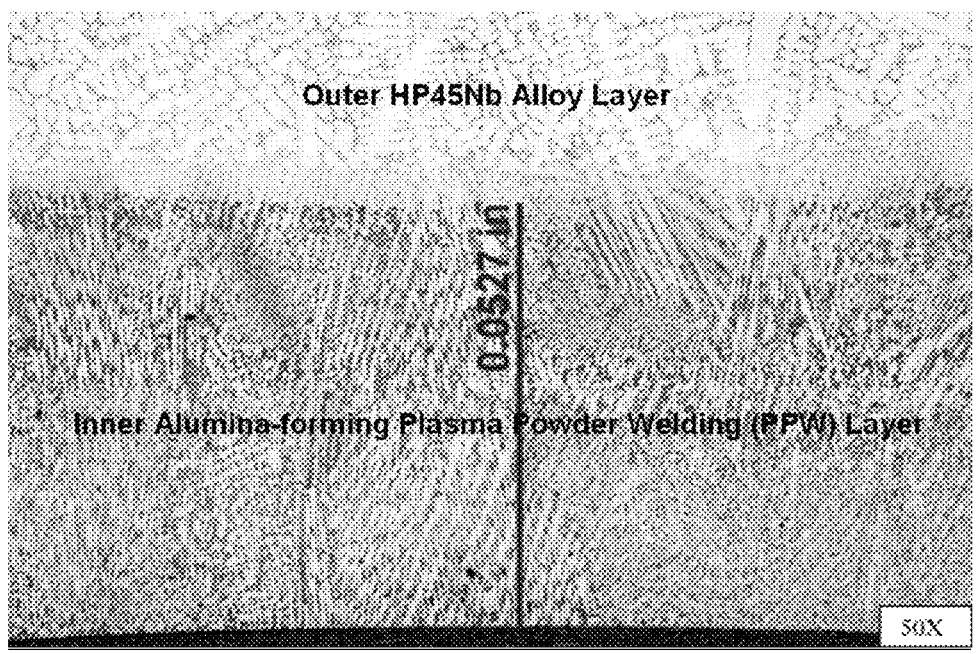

ALUMINA FORMING BIMETALLIC TUBE AND METHOD OF MAKING AND USING

This application claims benefit of U.S. Provisional Application No. 61/405,407 filed Oct. 21, 2010.

FIELD

The present disclosure provides for the composition of, methods of making and methods of using bimetallic tubes for fired heater tubes and/or transfer line exchangers for the transport of hydrocarbon feedstocks in petrochemical process and/or refinery process units in order to reduce corrosion, coking and fouling.

BACKGROUND

Petrochemical Processes

In petrochemical processes, ethylene is the lightest olefinic hydrocarbon and represents the largest building block for a variety of petrochemical products such as plastics, resins, fibers, solvents, etc. Ethylene does not occur freely in nature and is produced primarily from the thermal cracking of hydrocarbon feedstocks derived from natural gas and crude oil. The conventional hydrocarbon feedstocks used for the production of ethylene include ethane, propane, butane, pentanes and naphthas. Naphtha cracking represents about 45% of world production capacity, whereas nearly 35% of capacity is produced from ethane cracking. Other possible feeds include refinery offgas, natural gasoline liquids, wide-boiling condensate fractions, atmospheric and vacuum gas oils, and hydrotreated or hydrocracked vacuum gas oils.

The thermal cracking of hydrocarbon feedstocks, which is the main route to ethylene production, is carried out in tubular coils located in the radiant zone of fired heaters. Steam is added to reduce the partial pressure of the hydrocarbons in the radiant coils. The reactions that result in the transformation of mostly saturated hydrocarbons to olefins are highly endothermic and require reactor temperature in the range of 750 to 1050° C. depending on the feedstock and design of the reactor coils. Thermal cracking reactions also produce valuable by-products, including propylene, butadiene, benzene, gasoline, and hydrogen. The on-stream availability of the thermal cracking reactor is it determined by coking of either the cracking coils or the cracked effluent transfer line exchangers (TLEs). Coke is produced from aromatic feed component as a side product of thermal cracking and deposits on the radiant coil walls and inside the tubes of TLEs. This limits the heat transfer and increases the pressure drop, thus reducing the olefin selectivity. The run length is normally determined by the tube metal temperature increase of the radiant coil, the outlet temperature of the TLE, or the increased pressure drop.

Coke is believed to be formed by two mechanisms—catalytic and polymerization. The metal surface of the cracker coil catalyzes the growth of a filamentary type of coke and contains metal particles. The second type of coke is formed by condensation, polymerization, and/or agglomeration of heavies in the gaseous phase. The coking behavior of various feedstocks differs in cracking coils and TLEs, and these can be influenced by contaminants in the feed, dilution steam, and coil surface. In addition to general coking in cracking coils and TLEs, ethane and propane cracking plants experience coking at the inlet (on the tubesheet) of the TLEs due to gas-phase reactions at higher inlet temperatures and to the discontinuities in flow distribution. This inlet coking normally results in high-pressure drop, limiting the run length. Liquid-feed cracking results in coking on the TLE tubes near the outlet. This is caused by the condensation of tarry materials, which form a thin, oily layer that gradually polymerizes.

Steam cracking heaters are a very important part of an ethylene plant. Thermal cracking of hydrocarbons takes place in tubular coils placed in the center of a fired radiant box. The cracked effluents leave the radiant coils at a temperature of 750 to 1050° C., depending on feedstock, cracking severity, and selectivity. In order to maintain the overall process efficiency, it is required to efficiently recover the heat in the cracked effluents. The cracked effluents also need to be quenched quickly to stop secondary reactions that result in yield degradation. This is achieved by the TLEs, which cool the furnace effluents to nearly 350 to 450° C. at clean conditions, and this heat is used to generate very high pressure steam (~125 bar). The higher steam pressure results in higher tube metal temperature and therefore minimizes condensation of tarry materials.

The typical steam cracking heater consists of a convection section in the upper offset arrangement and a radiant section at the lower end. The vertical radiant coils are located close to the center plane of the radiant box and are suspended on a hanging system from the top of the radiant box. The hanging system allows the radiant coils to expand without causing any additional stresses on the radiant coils. The radiant coils are centrifugally cast from 25Cr/35Ni or 35Cr/45Ni alloys for their carburization and creep resistance. These materials have a maximum service temperature of up to 1150° C. The typical composition of radiant coil materials is shown in Table 1. The convection section recovers the flue-gas heat by preheating the hydrocarbon feedstocks and dilution steam. In addition, heat is recovered through boiler feed water preheating and superheating of very high pressure steam. The high temperature coil or part thereof is bare due to excessive tube metal temperatures, and normally all the other convection coils have fins to improve the heat-transfer coefficient.

TABLE 1

| Typical composition of radiant coil material | |
|---|---|
| Name of Materials | Elements in weight % (Balance is Fe) |
| HP45Nb | 23~27Cr, 33~38Ni, 1.2~1.8Si, 1.2~1.7Mn, 0.2 max. Mo, 0.4~0.5C, 0.6~1.6Nb, 0.020 max. P, 0.020 max. S |
| HP16Nb | 22.5~26Cr, 35.5~37Ni, 1.2~1.8Si, 1.2~1.6Mn, 0.2 max. Mo, 0.14~0.18C, 0.7~1.4Nb, 0.020 max. P, 0.020 max. S |
| HN10NiNb | 18~23Cr, 31~34Ni, 0.8~1.3Si, 1.2~1.6Mn, 0.2 max. Mo, 0.09~0.12C, 0.8~1.2Nb, 0.020 max. P, 0.020 max. S |
| HP 40 Mod | 23.5~26.5Cr, 34~37Ni, 1.5~2.0Si, 1.25 max. Mo, 0.37~0.45C, other elements (W, Nb) |
| Pompey HP 40W | 24~27Cr, 33-37Ni, 1.5~2.0Si, 1.5 max. Mo, 0.37~0.50C, 3.8~5.0W |

TABLE 1-continued

Typical composition of radiant coil material

| Name of Materials | Elements in weight % (Balance is Fe) |
|---|---|
| Pompey Manaurite XM | 23~28Cr, 33~38Ni, 1.0~2.0Si, 1.0~1.5Mo, 0.37~0.50C, other additions (Nb, Ti, Zr) |
| Manaurite XTM | 34~37Cr, 43~48Ni, 1.0~2.0Si, 1.0~2.0Mo, 0.4~0.45C, other additions (Nb, Ti) |
| Kubota KHR 45A | 30~35Cr, 40~46Ni, 2.0 max. Si, 2.0 max. Mn, 0.4~0.6C, other additions (Nb, Ti) |

All the listed materials for radiant coils and other tubular products for convection coils, TLEs, closed vent and drain systems and recycling and recovery of vent and purge streams are chromium-containing high grade alloys. The steam cracker alloy comprises at least 18 wt. % Cr and 10 wt. % Ni, and preferably at least 20 wt. % Cr and 30 wt. % Ni based on the total weight of the alloy. Corrosion protection of these materials relies on protective $Cr_2O_3$ films on the tube surface. Unfortunately, these chromia-forming materials often form a complex corrosion scale comprised of spinel and chromium carbide, leading to it rough surfaces, high surface areas, and a large number of surface sites for the anchoring of coke and coke precursors.

Currently, there are various metal-oxide-forming corrosion and coke mitigating technologies on the open market. These include SK Energy's PY-COAT™ Film, Alonizing™ coating, Westaims Coat Alloy™, and $C_2$ Nano's MIST Inhibitor. These technologies are based on metal-oxides including alumina, silica, zirconia and combination of thereof and have demonstrated their ability to reduce the formation of coke either in the laboratory or in the field. It is claimed that the active component of each product protects against corrosion and formation of a rough corrosion scale. However, in the field, these technologies generally perform well until the second cycle, where the coating layers have been physically and/or chemically compromised. The primary cause of poor long-term performance is known to be delamination and interdiffusion of the coated material on the steam cracker tubes.

Therefore, there is a need to significantly reduce corrosion and coking in the fired heater tubes in petrochemical processing operations that does not encounter the drawbacks associated with the current technologies.

Refinery Processes

In typical refinery processes, stored heavy crude oil is cleaned of contaminants (e.g., sand, salts and water) as the first step in the refining process by passage through desalting units. The clean crude feedstock is then heated by passing the desalted crude through a series of heat exchangers. The crude is then passed through a furnace that heats the crude oil to a higher temperature. The furnace, which may be an oil, natural or refinery fuel gas-fired furnace or electrically fired furnaces, heats the oil and is injected into an atmospheric distillation tower. The extreme heat produces physical splitting of the crude oil into combustion gas (furnace fuel gas) and other gaseous light ends, liquid products, and an atmospheric resid fraction.

A large amount of heavy resid content is characteristic of heavy oils. The atmospheric resid must be subjected to more refining. Following the atmospheric tower, the resid is further heated in another series of heat exchangers and then another furnace and sent to a vacuum distillation tower, where light vacuum gas oil and heavy vacuum gas oil are extracted from the resid. The remaining tarry fluid left near the base of the vacuum tower, the vacuum residue, can either be claimed as asphalt, or (ii) subject to further processing, such as coking. In various coking processes, the resid is heated to high temperatures of 850-950° F. (454-510° C.) such that the light boiling products are thermally cracked off of the aromatic cores in the resid and are distilled overhead and the solid coke remains.

The delayed coking process is one of the most widely commercially practiced of the coking processes. The resid is heated to the coking temperature by flowing through a long tube in a furnace and then allowed to react at this elevated temperature after flowing into the bottom of a high cylindrical insulated drum. The volatile products are removed to a fractionator and coke accumulates in the drum. The heavy liquid product from the fractionator is recycled back to the furnace. When the drum fills up with coke, the feed is switched to a second drum. The coke is mined out of the drum by drilling a hole down the center with high pressure water and cutting out the remainder also with high-pressure water to get the drum ready for the next coke accumulation cycle.

In Fluid Coking™, the resid is sprayed onto a hot, fluidized bed of coke particles in a vessel (i.e., the reactor). The volatile products are removed to a fractionator while the coke particles are removed from the bottom of the vessel and transferred to another vessel (i.e., the burner), where the coke is partially burned with air to provide heat for the process. The coke then is recirculated back to the reactor. Since this process produces much more coke than is required for heating the process, fluid coke is withdrawn at the bottom of the reactor.

In FLEXICOKING™, a third vessel (i.e., the gasifier), is added to the Fluid Coking process. In the gasifier, coke is gasified with steam and air in net reducing conditions to produce a low BTU gas containing hydrogen, carbon monoxide, nitrogen, and hydrogen sulfide. The hydrogen sulfide is removed using adsorption. The remaining low BTU gas is burned as a clean fuel within the refinery and/or in a nearby power plant.

Visbreaking is a low conversion thermal process used originally to reduce the resid viscosity for heavy fuel oil applications. Today, it often uses a resid that exceeds minimum heavy fuel oil specifications and converts just it enough to obtain 15-30% transportation boiling range liquids and still have the heavy product meet heavy fuel oil specifications. Since this process cannot tolerate coke formation, it is required to be within the coke induction period that may limit conversion, rather than heavy fuel oil specifications. A visbreaker reactor may be similar to a delayed coker with a furnace tube followed by a soaker drum. However, the drum is much smaller in volume to limit the residence time with the entire liquid product flowing through. Alternatively, the entire visbreaker may be a long tube coiled within a furnace. Upsets cause coke to form and accumulate on visbreaker walls, which requires periodic decoking.

The coker tube furnace is the heart of the delayed coking process. The heater furnishes all of the heat in the process.

Typically, there are two to four passes per furnace. The tubes are mounted horizontally on the side and held in place with alloy hangers. Multiple burners are along the bottom of the radiant wall opposite from the tubes and are fired vertically upward. Tall furnaces are advantageous since the roof tubes are less likely to have flame impingement and overheating by both radiation and convection. Normally just the radiant section of the heater is used to heat the oil for a delayed coker. The upper convection section of the coker heater is used in some refineries to preheat the oil going to the fractionator or for other uses (e.g., steam generation).

The radiant section tubes in a fired heater used in many refinery process units can experience fouling on the inside and/or outside of the tube surface. External tube fouling occurs when the heater is oil fired. During oil combustion solid particulate matter is formed containing carbon, sulfur and metals which are present in fuel oil. This particulate matter will over time collect on external tube surfaces. Fired heaters that heat crude and reduced crude usually experience the highest level of internal fouling. With these fluids, the fouling occurs due to (i) the presence of solids in the fluid, (ii) thermal cracking forming high molecular weight compounds and (iii) in situ corrosion products. All these materials can end up sticking to the tube wall and forming "coke". Liquids lighter than crude can also form internal deposits. For example, fired heaters heating liquid naphtha can experience internal tube fouling due to corrosion products and/or polymerization reactions forming long chain molecules which stick to the tube wall. Internal tube fouling usually has a large impact on heater operation and thermal efficiency.

These formations/foulant/coke deposits can result in an increase in the radiant tube metal temperature (TMT). As coke forms inside the heater tube, an insulation barrier between the metal and the "colder" process fluid is formed, resulting in an increased TMT. If coking is allowed to occur without intervention, a tube rupture as a result of high TMT (due to lessened metal strength) is possible. To avoid this, heaters with internal coke deposits can be operated at reduced rates (and hence reduced efficiency and productivity) such that metallurgical constrains are not exceeded on the tubes and tube rupture is avoided. Heaters in fouling service are designed to accommodate a specified TMT increase above the clean tube condition. When that limit is reached steps must be taken to remove the foulant. Often this means the heater must be shut down for cleaning. A secondary effect of internal fouling is increased pressure drop, which limits capacity and throughput. Heaters in fouling service are also designed to accommodate a specified increase in pressure drop in most cases, the TMT limit is reached before the pressure drop limit. When coke forms in the heater tubes, it insulates the inside of the tube which results in elevated temperatures on the outside of the tube. With good operational practices, coker furnace can be operational for 18 months before decoking of the tubes is needed. Depending on the tube metallurgy, when temperatures approach 1250° F. (677° C.) on the exterior skin thermocouple, the furnace must be steam spalled and/or steam-air decoked or cooled down and cleaned by hydraulic or mechanical pigging.

During normal use, the internal surfaces of the fired heater tubes are subject to carburization sulfidation, naphthenic acid corrosion and other forms of high temperature corrosion as a result of the prolonged exposure to the stream of heavy crude oil, resid and other petroleum fractions. Carburization is a form of high temperature degradation, which occurs when carbon from the environment diffuses into the metal, usually forming carbides in the matrix and along grain boundaries at temperatures generally in excess of 1000° F. (538° C.). Carburized material suffers an increase in hardness and often a substantial reduction in toughness, becoming embrittled to the point of exhibiting internal creep damage due to the increased volume of the carbides. Crude oils and hydrocarbon fractions which contain reactive sulfur are corrosive to carbon and low/medium alloy steels at temperatures above 500° F. (260° C.) and will cause sulfidation corrosion which forms iron sulfide. This sulfide scale that is formed is often referred to as sulfide induced fouling. Those which contain naphthenic acidic components are corrosive to carbon and low/medium alloy steels at temperatures above 400° F. (204° C.) and directly remove metal from the surface of the fired heater tube. Corrosion on the internal surfaces of the fired heater tubes creates an uneven surface that can enhance fouling because the various particles found in the petroleum stream may attach themselves to the roughened surface it is also suggested that corroded surfaces may also provide a "more hospitable" surface for foulant lay down.

Synthetic crudes are derived from processing of bitumens, shale, tar sands or extra heavy oils and are also processed in refinery operations. These synthetic crudes present additional fouling problems, as these feedstocks are too heavy and contaminant laden for the typical refinery to process. The materials are often pre-treated at the production site and then shipped to refineries as synthetic crudes. These crudes may contain fine particulate siliceous inorganic matter, such as in the case of tar sands. Some may also contain reactive olefinic materials that are prone to forming polymeric foulant deposits within the fired heater tubes.

Currently, there are various surface modification techniques available for reducing corrosion and fouling in the fired heater tubes for refinery operations. Most of them are based on thin film coatings and include alonizing, hexamethyldisilazane (HMDS) and liquid phase silicate coatings. Alonizing is a diffusion alloying method and applied to the metal surface at elevated temperatures. As a result, about 100μ thick, aluminum enriched layer forms on the metal surface. However, this coating, as characteristic of all such relatively thin coatings, reveals poor mechanical integrity and thermal stability due to presence of voids, defects and intermetallic brittle phases in the layer and has low reliability.

Therefore, there is a need to significantly reduce corrosion and fouling in the fired heater tubes in refinery processing operations that does not encounter the drawbacks associated with the current techniques.

SUMMARY

According to the present disclosure, an advantageous bimetallic tube for tired heater tubes and/or transfer line exchangers for the transport of hydrocarbon feedstocks in petrochemical process and/or refinery process units, comprises: i) an outer tube layer being formed from a steam cracker alloy comprising at least 18.0 wt. % Cr and at least 10.0 wt. % Ni; ii) an inner tube layer being formed from an alumina forming bulk alloy comprising 5.0 to 10.0 wt. % of Al, 18.0 wt. % to 25.0 wt. % Cr, less than 0.5 wt. % Si, and at least 35.0 wt. % Fe with the balance being Ni, wherein the inner tube layer is formed by plasma powder welding the alumina forming bulk alloy on the inner surface of the outer tube layer; and iii) an oxide layer formed on the surface of the inner tube layer, wherein the oxide layer comprises alumina, chromia, silica, mullite, spinets, or combinations thereof.

A further aspect of the present disclosure relates to an advantageous bimetallic tube for tired heater tubes and/or transfer line exchangers for the transport of hydrocarbon feedstocks in petrochemical process and/or refinery process units, comprising: i) an outer tube layer being formed from a steam cracker alloy comprising at least 20.0 wt. % Cr and at least 30.0 wt. % Ni, ii) an inner tube layer being formed from an alumina forming bulk alloy comprising 5.0 wt. % to 8.0 wt. % of Al, 19.0 wt. % to 24.0 wt. % Cr, less than 0.5 wt. % Si, and at least 35.0 wt. % Fe with the balance being Ni, wherein the inner tube layer is formed by plasma powder welding the alumina forming bulk alloy on the inner surface of the outer tube layer; and iii) an oxide layer formed on the surface of the inner tube layer, wherein the oxide layer comprises alumina, chromia, silica, mullite, spinels, or mixtures thereof.

Another aspect of the present disclosure relates to an advantageous method of making a bimetallic tube for fired heater tubes and/or transfer line exchangers for the transport of hydrocarbon feedstocks in petrochemical process and/or refinery process units, comprising the steps of: i) providing an outer tube layer, wherein said outer tube layer is formed from a steam cracker alloy comprising at least 18.0 wt. % Cr and at least 10.0 wt. % Ni; ii) plasma powder welding an inner tube layer on the inner surface of the outer tube layer, wherein the inner tube layer is formed from an alumina forming bulk alloy comprising 5.0 to 10.0 wt. % of Al, 18.0 wt. % to 25.0 wt. % Cr, less than 0.5 wt. % Si, and at least 35.0 wt. % Fe with the balance being Ni; and iii) forming an oxide layer on the surface of the inner tube layer, wherein the oxide layer comprises alumina, chromia, silica, mullite, spinels, or combinations thereof.

A still further aspect of the present disclosure relates to an advantageous method of making a bimetallic tube for fired heater tubes and/or transfer line exchangers for the transport of hydrocarbon feedstocks in petrochemical process and/or refinery process units, comprising the steps of: i) providing an outer tube layer being formed from a steam cracker alloy comprising at least 20.0 wt. % Cr and at least 30.0 wt. % Ni; ii) plasma powder welding an inner tube layer on the inner surface of the outer tube layer, wherein the inner tube layer is formed from an alumina forming bulk alloy comprising 5.0 wt. % to 8.0 wt. % of Al, 19.0 wt. % to 24.0 wt. % Cr, less than 0.5 wt. % Si, and at least 35.0 wt. % Fe with the balance being Ni; and iii) forming an oxide layer on the surface of the inner tube layer, wherein the oxide layer comprises alumina, chromia, silica, mullite, spinels, or combinations thereof.

A still yet further aspect of the present disclosure relates to an advantageous method of reducing corrosion, coking and/or fouling in fired heater tubes and transfer line exchangers for the transport of hydrocarbon feedstocks in refinery and petrochemical process operations comprising: providing bimetallic tubes for the fired heater tubes and/or the transfer line exchangers, wherein the bimetallic tubes comprise: i) an outer tube layer being formed from a steam cracker alloy comprising at least 18.0 wt. % Cr and at least 10.0 wt. % Ni; ii) an inner tube layer being formed from an alumina forming bulk alloy comprising 5.0 to 10.0 wt. % of Al, 18.0 wt. % to 25.0 wt. % Cr, less than 0.5 wt. % Si, and at least 35.0 wt. % Fe with the balance being Ni, wherein the inner tube layer is formed by plasma powder welding the alumina forming bulk alloy on the inner surface of the outer tube layer; and iii) an oxide layer formed on the surface of the inner tube layer, wherein the oxide layer comprises alumina, chromia, silica, mullite, spinels, or combinations thereof.

A still yet further aspect of the present disclosure relates to an advantageous method of reducing corrosion, coking and/or fouling in fired heater tubes and transfer line exchangers for the transport of hydrocarbon feedstocks in refinery and petrochemical process operations comprising: providing bimetallic tubes for the fired heater tubes and/or the transfer line exchangers. Wherein the bimetallic tubes comprise: an outer tube layer being formed from a steam cracker alloy comprising at least 20.0 wt. % Cr and at least 30.0 wt. % Ni; ii) an inner tube layer being formed from an alumina forming bulk alloy comprising 5.0 wt. % to 8.0 wt. % of Al, 19.0 wt. % to 24.0 wt. % Cr, less than 0.5 wt. % Si, and at least 35.0 wt. % Fe with the balance being Ni, wherein the inner tube layer is formed by plasma powder welding the alumina forming bulk alloy on the inner surface of the outer tube layer; and iii) an oxide layer formed on the surface of the inner tube layer, wherein the oxide layer comprises alumina, chromia, silica, mullite, spinets, or combinations thereof.

These and other features and attributes of the disclosed compositions for bimetallic tubes and methods of making and using of the present disclosure and their advantageous applications and/or uses will be apparent from the detailed description which follows, particularly when read in conjunction with the figures appended hereto.

BRIEF DESCRIPTION OF DRAWINGS

To assist those of ordinary skill in the relevant art in making and using the subject matter hereof, reference is made to the appended drawings, wherein:

FIG. 1 depicts a cross-sectional image of the bimetallic tube revealing the outer HP45Nb alloy layer and the inner alumina-forming plasma powder welding (PPW) layer.

DETAILED DESCRIPTION

All numerical values within the detailed description and the claims herein are modified by "about" or "approximately" the indicated value, and take into account experimental error and variations that would be expected by a person having ordinary skill in the art.

The present disclosure provides novel compositions and methods to achieve stable, durable surfaces to resist high temperature corrosion and coking in steam cracker furnace tubes, transfer line exchangers, and other components in steam cracker plants for transporting or conveying hydrocarbon process streams, which may be prone to coking. The present disclosure also provides novel compositions and methods to achieve stable, durable surfaces to resist high temperature corrosion and fouling in fired heater tubes, in refinery process units and other components used for transporting or conveying process streams, which may be prone to fouling.

In one non-limiting exemplary form, the present disclosure provides bimetallic tubes for fired heater tubes and/or transfer line exchangers for the transport of hydrocarbon feedstocks in petrochemical process and/or refinery process units comprising: i) an outer tube layer being formed from a steam cracker alloy comprising at least 18.0 wt. % Cr and 10.0 wt. % Ni; ii) an inner tube layer being formed from an alumina forming bulk alloy comprising 5.0 wt. % to 10.0 wt. % of Al, 18.0 wt. % to 25.0 wt. % Cr, less than 0.5 wt. % Si, and at least 35.0 wt. % Fe with the balance being Ni, wherein an inner tube layer is formed by a PPW process on the inner surface of the outer tube layer; and iii) an oxide layer formed on the surface of the inner tube layer, wherein the oxide layer is substantially comprised of alumina, chromia, silica, mullite, spinels, or mixtures thereof, wherein hydrocarbon feedstocks flow. The oxide layer is advantageously alumina.

In an alternative exemplary form, the present disclosure provides bimetallic tubes for fired heater tubes and/or transfer line exchangers for the transport of hydrocarbon feedstocks in petrochemical process and/or refinery process units comprising: i) an outer tube layer being formed from a steam cracker alloy comprising at least 20.0 wt. % Cr and at least 30.0 wt. % Ni, ii) an inner tube layer being formed from an alumina forming bulk alloy comprising 5.0 wt. % to 8.0 wt. % of Al, 19.0 wt. % to 24.0 wt. % Cr, less than 0.5 wt. % Si, and at least 35.0 wt. % Fe with the balance being Ni, wherein the inner tube layer is formed by a PPW process on the inner surface of the outer tube layer; and iii) an oxide layer formed on the surface of the inner tube layer, wherein the oxide layer is substantially comprised of alumina, chromia, silica, mullite, spinels, or mixtures thereof, wherein hydrocarbon feedstocks flow.

The bimetallic tubes disclosed herein include an oxide layer, an inner tube layer and an outer tube layer, which are described in detail below.

Oxide Layer

In one form, the oxide layer is a mono-layer or multi-layer and comprised of alumina, chromia, silica, mullite, spinets and mixtures thereof and may contain some impurity oxides formed from the element constituting an alumina forming bulk alloy. One advantageous oxide layer is substantially alumina. The alumina layer advantageously forms from the alumina forming bulk alloy comprising 5.0 wt. % to 10.0 wt. % of Al, 18.0 wt. % to 25.0 wt. % Cr, less than 0.5 wt. % Si, and at least 35.0 wt. % Fe, based on the total weight of the alumina forming bulk alloy. The thickness of an oxide layer may range from at it least 1 nm to 100 µm, or from at least 10 nm to 50 µm, or from at least 100 nm to 10 µm.

The oxide layer on the surface of the alumina forming bulk alloy forms in-situ during use of the alumina forming bulk alloy when exposed to hydrocarbon process streams in petrochemical or refining process units. Alternatively, the oxide layer on the surface of the alumina forming bulk alloy forms prior to use by exposing the bimetallic tube material to controlled low oxygen partial pressure environments.

In another form, the oxide layer on the surface of the alumina forming bulk alloy described herein may also be formed on the alumina forming bulk alloy by exposing the alumina forming bulk alloy to controlled low oxygen partial pressure environments. The controlled low oxygen partial pressure environments are gaseous environments having thermodynamic oxygen partial pressures less than that of air. Non-limiting examples of a controlled low oxygen partial pressure environment are a refinery or petrochemical plant steam, gaseous $H_2O:H_2$ mixture and a gaseous $CO_2:CO$ mixture. The controlled low oxygen partial pressure environment may further contain other gases such as $CH_4$, $N_2$, $O_2$, He, Ar and hydrocarbons, which may further enable formation of a stable oxide layer comprising alumina, chromia, silica, mullite, spinets, and mixtures thereof on the alumina forming bulk alloy. Therefore, the protective oxide layer may be formed prior to exposure of the alumina forming bulk alloy to hydrocarbon process streams in petrochemical and refinery process units. Non-limiting exemplary temperature ranges of the controlled low oxygen partial pressure environment may be from 500° C. to 1200° C., or from 600° C. to 1100° C. Non-limiting exemplary exposure times may range from 1 hour to 500 hours, or from 1 hour to 300 hours, or from 1 hour to 100 hours.

Inner Tube Layer

In one form, the alumina forming bulk alloy comprises 5.0 wt. % to 10.0 wt. % of Al, 18.0 wt. % to 25.0 wt. % Cr, less than 0.5 wt. % Si, and at least 35.0 wt. % Fe with the balance being Ni. The alumina forming bulk alloy compositions of the present disclosure offers significant advantages relative to prior art alloy compositions for use as the bimetallic tube to mitigate corrosion and coking of the fired heater tubes when exposed to hydrocarbon streams in petrochemical and refining process units. In particular, it was unexpectedly found that both Fe and Si contents in the alumina-forming bulk alloy composition are beneficial to fabricate a crack-free bimetallic tube with steam cracker alloys.

In one form, the alumina forming bulk alloy comprises at least 35.0 wt. % iron based on the total weight of the alumina forming bulk alloy. Presence of iron in the alumina forming bulk alloy provides improved thermal and mechanical compatibility with steam cracker alloys to fabricate crack-free bimetallic tube of the instant disclosure. In another form of the present disclosure, the iron content is between 35.0 wt. % and 40.0 wt %.

The alumina forming hulk alloy includes 5.0 wt. % to 10.0 wt. % aluminum, or 5.0 wt. % to 9.0 wt. % aluminum, or 6.0 wt. % to 8.0 wt. % aluminum, or 5.0 wt. % to 8.0 wt. % aluminum, or 6.0 wt. % to 6.5 wt. % aluminum. The alumina forming bulk alloy further includes 18.0 wt. % to 25.0 wt. % chromium, or 19.0 wt % to 24.0 wt % chromium, or 20.0 wt. % to 22.5 wt % chromium. The alumina forming bulk alloy may also include less than 0.5 wt. % silicon, or less than 0.45 wt. % silicon, or less than 0.40 wt. % silicon. Excessive amounts of silicon (e.g., greater than 0.6 wt. % silicon) in the alumina forming bulk alloy may promote solidification-induced cracking. In one form, the alumina forming bulk alloy may include less than 0.1 wt. % carbon, or less than 0.08 wt. % carbon, or less than 0.05 wt. % carbon. Carbon can be present in the alumina forming bulk alloy as a form of carbide precipitates, which provide creep strength of the alumina forming hulk alloy when it is exposed to high temperatures for extended periods of time.

Alloying elements, such as for example, Ga, Ge, As, In, Sn, Sb, Pb, Pd, Pt, Cu, Ag and Au, provide reduced coking because these elements are non-catalytic to surface carbon transfer reaction. Alloying elements, such as for example, Re, Ru, Rh, Ir, Pd, Pt, Cu, Ag and Au, provide increased coating integrity, stability and durability and provide a defect-free alumina layer when it forms from the alumina forming bulk alloy including 5.0 wt. % to 10.0 wt. % of Al, 18.0 wt. % to 25.0 wt. % Cr, less than 0.5 wt. % Si, and at least 35.0 wt. % Fe. In one form, the alumina forming bulk alloy disclosed herein includes 0.1 wt. % to 2.0 wt. % of at least one element selected from Ga, Ge, As, in, Sn, Sb, Pb, Pd, Pt, Cu, Ag, Au and combinations thereof. In another form, the alumina forming bulk alloy disclosed herein includes 0.1 wt. % to 2.0 wt. % of at least one element chosen from Re, Ru, Rh, Ir, Pd, Pt, Cu, Ag, Au and combinations thereof.

The alumina forming bulk alloy may further include 0.01 wt. % to 2.0 wt. % of at least one element chosen from Sc, La, Y, Ce and combinations thereof. In yet another form, the alumina, forming bulk alloy may include 58.5 wt. % nickel, 10.0 wt. % iron, 6.0 wt. % aluminum, 25.0 wt. % chromium, and 0.5 wt. % yttrium. In still another form, the alumina forming bulk alloy includes wt. % nickel, 34.5 wt. % iron, 5.0 wt. % aluminum, 25.0 wt. % chromium, and 0.5 wt. % yttrium. The alumina forming bulk alloy may further include 0.01 wt. % to 2.0 wt. % of oxide particles of at least one element chosen from Al, Si, Sc, La, Y, Ce and combinations thereof. In yet another form, the alumina forming bulk alloy includes 58.5 wt. % nickel, 10.0 wt. % iron, 6.0 wt. % aluminum, 25.0 wt. % chromium, and 0.5 wt. % $Y_2O_3$. In still yet another form, the alumina forming bulk alloy includes 35.0 wt. % nickel, 34.5 wt. % iron, 5.0 wt. % aluminum, 25.0 wt. % chromium, and 0.5 wt. % $Y_2O_3$. The alumina forming bulk alloy may further include 0.01 wt. % to 4.0 wt. % of at least one element chosen from Mn, Ti, Zr, Hf, V, Nb, Ta, Mo, W, and combinations thereof.

In one advantageous form, the alumina forming bulk alloy includes 21.0 wt. % Cr, 6.3 wt. % Al, 38.7 wt. % Fe, 0.41 wt. % Si with the balance being Ni. In yet another advantageous form, the alumina forming bulk alloy includes 21.0 wt. % Cr, 6.2 wt. % Al, 38.9 wt. % Fe, 0.43 wt. % Si with the balance being Ni. In yet another advantageous form, the alumina forming bulk alloy includes 22.1 wt. % Cr, 6.9 wt. % Al, 36.3 wt. % Fe, 0.20 wt. % Si with the balance being Ni. In another advantageous form, the alumina forming bulk alloy includes 20.0 wt. % to 22.5 wt. % Cr, 6.0 wt. % to 8.0 wt. % Al, 35.0 wt. % to 40.0 wt. % Fe, less than 0.45 wt. % Si with the balance being Ni. In still yet another advantageous form, the alumina forming bulk alloy is comprised of 20.0 wt. % to 22.0 wt. % Cr, 6.0 wt. % to 6.5 wt. % Al, 37.0 wt. % to 40.0 wt. % Fe, less than 0.45 wt. % Si with the balance being Ni. In still yet another advantageous form, the alumina forming bulk alloy is comprised of 19.0 wt. % to 24.0 wt. % Cr, 5.0 wt. % to 7.0 wt. % Al, 35.0 wt. % to 40.0 wt. % Fe, less than 0.3 wt. % Si with the balance being Ni.

The alumina forming bulk alloy may further include intermetallic precipitates at from 0.1 wt. % to 30.0 wt. %, including, but not limited to, $Ni_3Al$, NiAl and sigma-phase. The alumina forming bulk alloy may further include inclusions at from 0.01 wt. % to 5.0 wt. %, including, but not limited to, oxide, carbide, nitride and carbonitride inclusions. These intermetallic precipitates and inclusions are formed from the constituting elements of the alumina forming bulk alloy including, but not limited to, Fe, Ni, Cr, Al and Si. Both intermetallic precipitates and oxide, carbide, nitride and carbonitride inclusions may provide improved high temperature creep strength.

The alumina forming bulk alloy of the present disclosure has a low porosity, which contributes to its improved resistance to corrosion and coking when exposed to hydrocarbon streams in petrochemical and refining process units. The alumina forming bulk alloy has less than 2.0 vol. % porosity, or less than 1.0 vol. % porosity, or less than 0.5 vol. % porosity, or less than 0.1 vol. % porosity. Excessive porosity in the alumina forming bulk alloy serves as a pathway for gaseous molecules of hydrocarbon streams in petrochemical and refining process units to transfer gaseous molecules to the alumina forming bulk alloy interior. The transfer of gaseous molecules triggers corrosion in the alumina forming bulk alloy and deterioration of mechanical strength. Thus, it is advantageous to achieve an alumina forming bulk alloy including a minimal amount of porosity.

In one advantageous form, the low porosity of the alumina forming bulk alloy may be formed by a powder plasma welding (PPW) method. PPW is not a coating technology like thermal spraying, but a welding overlay technology. With PPW, metal powder is melted and welded by plasma torch on the inside surface of the base tube. A metal overlay having a thickness of 1.0 to 3.0 mm, 1.5 to 2.5 mm, or 1.75 to 2.25 mm is strongly bonded to base tube and provides the almost pore-free layer. The alumina forming bulk alloy may be optionally post-annealed, tempered, laser melted or a combination thereof to achieve a higher density material.

In contrast, the conventional thermal spray coating processes such as plasma, HVOF and detonation gun generally yield a coating metal layer that is of a higher porosity. The conventional thermal spray coating is produced by a process in which molten or softened particles are applied by impact onto a substrate. The coating often contains reticular or lamellar grain structure resulting from the rapid solidification of small globules, flattened from striking a cold surface at high velocities. It is difficult to ensure that all particles are the exact same size and achieve the same temperature and velocity. Thus, variations in the conditions of the individual particles on impact during thermal spray process lead to heterogeneous structure, which includes excessive porosity.

In accordance with one aspect of the present disclosure, the interior surface of the wall of the fired heater tubes being formed from an alumina forming bulk alloy disclosed herein may have an average surface roughness (Ra) of less than 40 micro inches (1.1 μm), or less than 20 micro inches (0.5 μm), or less than 10 micro inches ((125 μm). In various forms, the inner surfaces of the plurality of the fired heater tubes disclosed herein may have the above-mentioned surface roughness. Such a surface roughness may further reduce coking. The smooth surface within the inner diameter of the fired heater tubes may reduce coking of the hydrocarbon stream flowing through the tubes.

Exemplary non-limiting means of reducing the surface roughness may include mechanical polishing, electro polishing, lapping and combinations thereof. There are additional benefits of reducing the surface roughness of the coated metal. One of the benefits is the shifting from a linear growth rate of the foulant, which results in the continuous thickening of the foulant deposit; to an asymptotic growth rate which reaches a finite thickness and then stops thickening.

Outer Tube Layer

In accordance with another aspect of the present disclosure, the outer tube layer of the alumina-forming bimetallic tube may be formed from a steam cracker alloy including at least 18.0 wt. % Cr and 10.0 wt. % Ni, and advantageously at least 20.0 wt. % Cr and 30.0 wt % Ni. Non-limiting examples of such an alloy include HP45Nb, HP16Nb, HN10NiNh, HP 40 Mod, Pompey HP 40W, Pompey Manaurite XM, Manaurite XTM, and Kubota KHR 45A as listed in Table 1. Thus, the alumina forming bulk alloy of the instant disclosure may be applied to the interior surface of the steam cracker alloy by a PPW method in order to ensure low porosity and metallurgical bonding. During use or prior to exposure to hydrocarbon streams, a protective alumina layer forms on the surface of the alumina forming bulk alloy, which provides corrosion and is coking resistance.

Other Exemplary Embodiments

Thus, the present disclosure provides a bimetallic tube for use in petrochemical process and refinery process units, including: i) an outer tube layer being formed from a steam cracker alloy comprising at least 18.0 wt. % Cr and 10.0 wt. % Ni; ii) an inner tube layer being formed from an alumina forming bulk alloy comprising 5.0 wt. % to 10.0 wt. % of Al, 18.0 wt % to 25.0 wt. % Cr, less than 0.5 wt. % Si, and at least 35.0 wt. % Fe with the balance being Ni, wherein an inner tube layer is formed by a PPW process on the inner surface of the outer tube layer; and iii) an oxide layer formed on the surface of the inner tube layer, wherein the oxide layer is substantially comprised of alumina, chromia, silica, mullite, spinels, or mixtures thereof, wherein hydrocarbon feedstocks flow.

In an alternative form, the present disclosure also provides a bimetallic tube for use in petrochemical process and refinery process units, including: i) an outer tube layer being formed from a steam cracker alloy comprising at least 20.0 wt. % Cr and at least 30.0 wt. % Ni, ii) an inner tube layer being formed from an alumina forming bulk alloy comprising 5.0 wt. % to 8.0 wt. % of Al, 19.0 wt. % to 24.0 wt. % Cr, less than 0.5 wt. % Si, and at least 35.0 wt. % Fe with the balance being Ni, wherein the inner tube layer is formed by a PPW process on it the inner surface of the outer tube layer; and iii) an oxide layer formed on the surface of the inner tube layer, wherein the oxide layer is substantially comprised of alumina, chromia, silica, mullite, spinets, or mixtures thereof, wherein hydrocarbon feedstocks flow.

The present disclosure also provides a method for reducing corrosion and coking of fired heater tubes and/or transfer line exchangers for the transport of hydrocarbon feedstocks in petrochemical process and/or refinery process units. The method provides a bimetallic tube for use in petrochemical process and refinery process units, including: i) an outer tube layer being formed from a steam cracker alloy comprising at least 18.0 wt. % Cr and 10.0 wt. % Ni; ii) an inner tube layer being formed from an alumina forming bulk alloy comprising 5.0 wt. % to 10.0 wt. % of Al, 18.0 wt. % to 25.0 wt. % Cr, less than 0.5 wt. % Si, and at least 35.0 wt. % Fe with the balance being Ni, wherein an inner tube layer is formed by a PPW process on the inner surface of the outer tube layer; and iii) an oxide layer formed on the surface of the inner tube layer, wherein the oxide layer is substantially comprised of alumina, chromia, silica, mullite, spinets, or mixtures thereof, wherein hydrocarbon feedstocks flow.

In an alternative form, a method for reducing corrosion and coking of the fired heater tubes and/or transfer line exchangers for the transport of hydrocarbon feedstocks in petrochemical process and/or refinery process units includes providing a bimetallic tube for use in petrochemical process and refinery process units comprising: i) an outer tube layer being formed from a steam cracker alloy comprising at least 20.0 wt. % Cr and at least 30.0 wt. % Ni, ii) an inner tube layer being formed from an alumina forming bulk alloy comprising 5.0 wt. % to 8.0 wt. % of Al, 19.0 wt. % to 24.0 wt. % Cr, less than 0.5 wt. % Si, and at least 35.0 wt. % Fe with the balance being Ni, wherein the inner tube layer is formed by a PPW process on the inner surface of the outer tube layer; and iii) an oxide layer formed on the surface of the inner tube layer, wherein the oxide layer is substantially comprised of alumina, chromia, silica, spinels, or mixtures thereof, wherein hydrocarbon feedstocks flow.

The present disclosure also provides a method of making a bimetallic tube for fired heater tubes and/or transfer line exchangers for the transport of hydrocarbon feedstocks in petrochemical process and/or refinery process units, including the steps of: i) providing an outer tube layer, wherein said outer tube layer is formed from a steam cracker ahoy comprising at least 18.0 wt. % Cr and at least 10.0 wt. % Ni, ii) plasma powder welding an inner tube layer on the inner surface of the outer tube layer, wherein the inner tube layer is formed from an alumina forming bulk alloy comprising 5.0 to 10.0 wt. % of Al, 18.0 wt. % to 25 wt. % Cr, less than 0.5 wt. % Si, and at least 35.0 wt. % Fe with the balance being Ni; and iii) forming an oxide layer on the surface of the inner tube layer, wherein the oxide layer comprises alumina, chromia, silica, mullite, spines, or combinations thereof.

In an alternative form, a method of making a bimetallic tube for fired heater tubes and/or transfer line exchangers for the transport of hydrocarbon feedstocks in petrochemical process and/or refinery process units, includes the steps of: i) providing an outer tube layer being formed from a steam cracker alloy comprising at least 20.0 wt. % Cr and at least 30.0 wt. % Ni; ii) plasma powder welding an inner tube layer on the inner surface of the outer tube layer, wherein the inner tube layer is formed from an alumina forming bulk alloy comprising 5.0 wt. % to 8.0 wt. % of Al, 19.0 wt. % to 24.0 wt. % Cr, less than 0.3 wt. % Si, and at least 35.0 wt. % Fe with the balance being Ni; and iii) forming an oxide layer on the surface of the inner tube layer, wherein the oxide layer comprises alumina, chromia, silica, mullite, spinets, or combinations thereof.

Advantages and Applications

Metal surfaces to reduce corrosion, fouling and coking of the fired heater tubes exposed to hydrocarbon streams in petrochemical and refining process units may be constructed of the alumina forming bulk alloy disclosed herein.

The advantages of the disclosed bimetallic tubes of the present disclosure include, inter alia, one or more of reduced corrosion and/or reduced fouling in the fired heater tubes in refinery processing operations and reduced corrosion and/or reduced coking in the fired heater tubes in petrochemical processing operations. More particularly, the advantages of the compositions disclosed herein include, but are not limited to, a reduction of carburization and sulfidation corrosion and the reduction of coking in fired heater tubes in petrochemical processing facilities, refinery process units, and in other ancillary and related industries such as synthetic fuels processes (e.g., coal to liquids, coal gasification and gas to liquids) and other components used for transporting or conveying hydrocarbon process streams, which may be prone to corrosion and coking. The present disclosure also relates to the reduction of corrosion and coking associated with process streams, which include, but are not limited to hydrocarbon feedstock streams encountered in petrochemical processes. It more particularly relates to methods of reducing corrosion and coking in fired heater tubes in a steam cracking furnace by use of alumina forming bimetallic tube.

The bimetallic tubes of the present disclosure described herein may be utilized in the following non-limiting types of applications and uses. Surfaces of the fired heater tubes which would benefit from the alumina forming bulk alloy of the instant disclosure include apparatus, reactor systems and units that are in contact with hydrocarbon process streams at any time during use. In petrochemical process applications, these apparatus, reactor systems and units it include, but are not limited to, radiant coil, convection coil and transfer line exchangers (TLEs) in steam cracker furnaces and other components used for transporting or conveying hydrocarbon process streams, which may be prone to corrosion and coking. In refining process applications, these apparatus, reactor systems and units include, but are not limited to, atmospheric and vacuum distillation pipestills, cokers and visbreakers in refinery processing facilities and other components used for transporting or conveying process streams, which may be prone to corrosion and fouling.

Test Methods

Chemical composition may be determined by electron probe micro-analyzer (EPMA). EPMA is fundamentally the same as scanning electron microscopy (SEM) with the added capability of chemical analysis. The primary importance of EPMA is the ability to acquire precise, quantitative elemental analyses by wavelength dispersive spectroscopy (WDS). The spatial scale of analysis, combined with the ability to create detailed images of the sample, makes it possible to analyze materials in situ and to resolve complex chemical variation within single phases.

Roughness is routinely expressed as the arithmetic average roughness (Ra). The arithmetic average height of roughness component of irregularities from the mean line is measured within the sample length L. The standard cut-off is 0.8 mm with a measuring length of 4.8 mm. This measurement conforms to ANSI/ASME B46.1 "Surface Texture—Surface Roughness, Waviness and Lay", which was employed in determining the surface roughness in accordance with the present disclosure.

The following are examples of the present disclosure and are not to be construed as limiting.

EXAMPLES

Example 1

Crack-free Alumina-Forming Bimetallic Tube Made Out of HP45Nb Steam Cracker Alloy A steam cracker tube was prepared by centrifugal casting by use of HP45Nb alloy. A small tube segment in the size of 3.03" OD×2.0" ID×12.0" L was prepared and the interior surface of the tube was machined for the PPW process. The alumina forming PPW powder "N" was prepared via argon gas atomization method. The powder was sieved to a certain size to enable easy flow during the PPW process. The chemical composition of the power "N" was Balanced Ni:19.82Cr: 7.36Al:39.30Fe:0.25Si in wt. %. The bimetallic tube was fabricated by applying the powder "N" onto the interior surface of the HP45Nb alloy tube via the PPW method.

The resultant bimetallic tube was comprised of: i) a 25 mm thick outer tube layer of HP45Nb alloy, ii) a 1.4 mm thick inner tube layer being formed from an alumina forming bulk alloy, and iii) a 50 nm thick native alumina, film formed on the surface of the inner tube layer. The cross sectional image of the bimetallic tube revealing the outer HP45Nb alloy layer and the inner alumina-forming PPW layer is shown in FIG. 1.

The chemical composition of alumina forming bulk alloy was Balanced Ni:21.00Cr:6.33Al:38.70Fe:0.41 Si in wt. %. Due to less than 0.45 wt. % Si and 37 wt % to 40 wt. % Fe, a crack-free alumina-forming bimetallic tube was fabricated. Detailed microscopic examination by use of SEM revealed columnar grain structure of the inner tube layer being formed from an alumina forming bulk alloy by a PPW process. Also observed in the microstructure were Al-rich $Ni_3Al$ or NiAl type grains, aluminum nitride inclusions and Cr-rich carbide precipitates. In order to prove bimetallic tube integrity, a 150 kg diamond indention was made along the interface between the outer HP45Nb alloy layer and the inner alumina-forming PPW layer. No cracking or disbanding along the interface was visible, which is a qualitative indication that the bimetallic tube was well bonded.

Example 2

Crack-free Alumina-Forming Bimetallic Tube Made Out of HP16Nb Steam Cracker Alloy A steam cracker tube was prepared by centrifugal casting by use of HP16Nb alloy. A small tube segment in the size of 3.03" OD×2.0" ID×12.0" L was prepared and the interior surface of the tube was machined for the PPW process. The alumina forming PPW powder "N" was prepared via argon gas atomization method. The powder was sieved to a certain size to enable easy flow during the PPW process. The chemical composition of the power "N" was Balanced Ni:19.82Cr: 7.36Al:39.30Fe:0.25Si in wt. %. The bimetallic tube was fabricated by applying the powder "N" onto the interior surface of the HP16Nb alloy tube via the PPW method.

The resultant bimetallic tube was comprised of: i) a 25 mm thick outer tube layer of HP16Nb alloy, ii) a 1.3 mm thick inner tube layer being formed from an alumina forming bulk alloy, and iii) a 50 nm thick native alumina film formed on the surface of the inner tube layer.

The chemical composition of alumina forming bulk alloy was Balanced Ni:20.97Cr:6.19Al:38.91Fe:0.43Si in wt. %. Due to less than 0.45 wt. % Si and 37 wt. % to 40 wt. % Fe, a crack-free alumina-forming bimetallic tube was fabricated. Detailed microscopic examination by use of SEM revealed columnar grain structure of the inner tube layer being formed from an alumina forming it hulk alloy by a PPW process. Also observed in the microstructure were Al-rich $Ni_3Al$ or NiAl type grains, aluminum nitride inclusions and Cr-rich carbide precipitates in order to prove bimetallic tube integrity, a 150 kg diamond indention was made along the interface between the outer HP alloy layer and the inner alumina-forming PPW layer. No cracking or disbanding along the interface was visible, which is a qualitative indication that the bimetallic tube was well bonded.

Example 3 (Comparative Example)

Cracked Alumina-Forming Bimetallic Tube Made Out of HP45Nb Steam Cracker Alloy A steam cracker tube was prepared by centrifugal casting by use of HP45Nb alloy. A small tube segment in the size of 3.03" OD×2.0" ID×12.0" L was prepared and the interior surface of the tube was machined for the PPW process. The alumina forming PPW powder "M" was prepared via argon gas atomization method. The powder was sieved to a certain size to enable easy flow during the VFW process. The chemical composition of the powder "M" was Balanced Ni:20.19Cr:6.76Al:32.60Fe:0.31Si in wt. %. The bimetallic tube was fabricated by applying the powder "M" onto the interior surface of the HP45Nb alloy tube via the PPW method.

The resultant bimetallic tube was comprised of: i) a 25 mm thick outer tube layer of HP45Nb alloy, ii) al 0.4 mm thick inner tube layer being formed from an alumina forming bulk alloy, and iii) a 50 nm thick native alumina film formed on the surface of the inner tube layer. The chemical composition of alumina forming bulk alloy was Balanced Ni:21.95CE5.25Al:34.06Fe:0.64Si in wt %. Due to higher amount of Si exceeding 0.45 wt. % and lower amount of Fe, the resultant alumina-forming bimetallic tube revealed small cracks after standard penetration test. This result confirms that both less than 0.45 wt. % Si and 37 wt. % to 40 wt. % Fe in the alumina-forming PPW layer is critical to fabricate the crack-free bimetallic tube of this disclosure.

Example 4 (Comparative Example)

Cracked Alumina-Forming Bimetallic Tube Made Out of HP16Nb Steam Cracker Alloy A steam cracker tube was prepared by centrifugal casting by use of HP16Nb alloy. A small tube segment in the size of 3.03" OD×2.0" ID×12.0" L was prepared and the interior surface of the tube was machined for the PPW process. The alumina forming PPW powder "M" was prepared via argon gas atomization method. The powder was sieved to a certain size to enable easy flow during the PPW process. The chemical composition of the powder "M" was Balanced Ni:20.19Cr:6.76Al:32.60Fe:0.31Si in wt. %. The bimetallic tube was fabricated by applying the powder "M" onto the interior surface of the HP16Nb alloy tube via the PPW method.

The resultant bimetallic tube was comprised of: i) a 25 mm thick outer tube layer of HP16Nb alloy, ii) a 1.4 mm thick inner tube layer being formed from an alumina forming bulk ahoy, and iii) a 50 μm thick native alumina film formed on the surface of the inner tube layer. The chemical composition of alumina forming bulk alloy was Balanced Ni:21.80Cr: 4.95Al:33.70Fe:0.61Si in wt. %. Due to higher amount of Si exceeding 0.45 wt. % and lower amount of Fe, the resultant alumina-forming bimetallic tube revealed small cracks after standard penetration test. This result confirms that both less than 0.45 wt. % Si and 37 wt % to 40 wt % Fe in the alumina-forming PPW layer is critical to fabricate the crack-free bimetallic tube of this disclosure.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A bimetallic tube for fired heater tubes and/or transfer line exchangers for transport of hydrocarbon feedstocks in petrochemical process and/or refinery process units, comprising:
   i) an outer tube layer of a HP45Nb alloy or HP16Nb alloy comprising 22.5 to 27.0 wt. % Cr, 33.0 to 38.0 wt. % Ni, 1.2 to 1.8 wt. % Si, 1.2 to 1.7 wt. % Mn, 0.2 max. wt. % Mo, 0.14 to 0.5 wt. % C, 0.6 to 1.6 wt. % Nb, 0.02 max wt. % P and 0.02 max wt. % S with balance being Fe;
   ii) an inner tube layer being formed from an alumina forming bulk alloy comprising 6.19 to 6.33 wt. % of Al, 20.97 to 21.00 wt. % Cr, 0.41 to 0.43 wt. % Si, 38.7 to 38.9 wt. % Fe and 0.1 wt. % to 30.0 wt. % of at least one intermetallic precipitate chosen from Ni3Al, NiAl, sigma-phase, and combinations thereof with balance being Ni, wherein the inner tube layer is formed by plasma powder welding the alumina forming bulk alloy on an inner surface of the outer tube layer; and
   iii) an oxide layer formed on a surface of the inner tube layer, wherein the oxide layer comprises alumina.

2. The bimetallic tube of claim 1, wherein the inner tube layer further comprises less than 0.01 wt. % carbon.

3. The bimetallic tube of claim 1, wherein the inner tube layer further comprises 0.1 wt. % to 2.0 wt. % of at least one element chosen from Ga, Ge, As, In, Sn, Sb, Pb, Pd, Pt, Cu, Ag, Au and combinations thereof.

4. The bimetallic tube of claim 1, wherein the inner tube layer further comprises 0.1 wt. % to 2.0 wt. % of at least one element chosen from Re, Ru, Rh, Ir, Pd, Pt, Cu, Ag, Au and combinations thereof.

5. The bimetallic tube of claim 1, wherein the inner tube layer further comprises 0.01 wt. % to 2.0 wt. % of at least one element chosen from Sc, La, Y, Ce and combinations thereof.

6. The bimetallic tube of claim 1, wherein the inner tube layer further comprises 0.01 wt. % to 2.0 wt. % of oxide particles of at least one element chosen from Al, Si, Sc, La, Y, Ce and combinations thereof.

7. The bimetallic tube of claim 1, wherein the inner tube layer further comprises 0.01 wt. % to 4.0 wt. % of at least one element chosen from Mn, Ti, Zr, Hf, V, Nb, Ta, Mo, W, and combinations thereof.

8. The bimetallic tube of claim 1, wherein the inner tube layer further comprises 0.01 wt. % to 5.0 wt. % of at least one inclusion chosen from an oxide, a carbide, a nitride, a carbonitride, and combinations thereof.

9. The bimetallic tube of claim 1, wherein the alumina forming bulk alloy has a porosity of less than 2.0 vol. %.

10. The bimetallic tube of claim 1, wherein the alumina forming bulk alloy has an average interior surface roughness (Ra) of less than 1.1 μm.

11. The bimetallic tube of claim 1, wherein the oxide layer is a mono-layer or a multi-layer structure.

12. The bimetallic tube of claim 1, wherein the oxide layer ranges from 1 nm to 100 μm in thickness.

13. A method of making a bimetallic tube for fired heater tubes and/or transfer line exchangers for the transport of hydrocarbon feedstocks in petrochemical process and/or refinery process units, comprising the steps of:
   i) providing an outer tube layer of a HP45Nb alloy or HP16Nb alloy, wherein said outer tube layer comprises 22.5 to 27.0 wt. % Cr 33.0 to 38.0 wt. % Ni, 1.2 to 1.8 wt. % Si, 1.2 to 1.7 wt. % Mn, 0.2 max. wt. % Mo, 0.14 to 0.5 wt. % C, 0.6 to 1.6 wt. % Nb, 0.02 max wt. % P and 0.02 max wt. % S with balance being Fe;
   ii) plasma powder welding an inner tube layer on the inner surface of the outer tube layer, wherein the inner tube layer is formed from an alumina forming bulk alloy comprising 6.19 to 6.33 wt. % of Al, 20.97 to 21.00 wt. % Cr, 0.41 to 0.43 wt. % Si, 38.7 to 38.9 wt. % Fe and 0.1 wt. % to 30.0 wt. % of at least one intermetallic precipitate chosen from Ni3Al, NiAl, sigma-phase, and combinations thereof with balance being Ni; and
   iii) forming an oxide layer on the surface of the inner tube layer, wherein the oxide layer comprises alumina.

14. The method of claim 13, wherein the forming of the oxide layer on the surface of the inner tube layer occurs in-situ during use of the alumina forming bulk alloy when exposed to hydrocarbon process streams in petrochemical or refining process units.

15. The method of claim 13, wherein the forming of the oxide layer on the surface of the inner tube layer occurs prior to use by exposing the bimetallic tube material to a controlled low oxygen partial pressure environment.

16. The method of claim 15, wherein the controlled low oxygen partial pressure environment is chosen from refinery plant steam, petrochemical plant steam, a gaseous $H_2O:H_2$ mixture, and a gaseous $CO_2:CO$ mixture.

17. The method of claim 15, wherein the controlled low oxygen partial pressure environment further includes one or more other gases chosen from $CH_4$, $NH_3$, $N_2$, $O_2$, He, Ar, hydrocarbons and combinations thereof.

18. The method of claim 15, wherein the controlled low oxygen partial pressure environment temperature is from 500° C. to 1200° C.

19. The method of claim 15, wherein the controlled low oxygen partial pressure environment exposure time is from 1 hour to 500 hours.

20. The method of claim 13 further including densifying the inner tube layer by a method chosen from post-annealing, tempering, laser melting and combinations thereof.

21. The method of claim 13 further including reducing the surface roughness of the inner tube layer by a method chosen from mechanical polishing, electro polishing, lapping and combinations thereof.

22. A method of reducing corrosion, coking and/or fouling in fired heater tubes and transfer line exchangers for transport of hydrocarbon feedstocks in refinery and petrochemical process operations comprising:

providing bimetallic tubes for the fired heater tubes and/or the transfer line exchangers, wherein the bimetallic tubes comprise:

i) an outer tube layer of a HP45Nb alloy or HP16Nb alloy comprising 22.5 to 27.0 wt. % Cr 33.0 to 38.0 wt. % Ni, 1.2 to 1.8 wt. % Si, 1.2 to 1.7 wt. % Mn, 0.2 max. wt. % Mo, 0.14 to 0.5 wt. % C, 0.6 to 1.6 wt. % Nb, 0.02 max wt. % P and 0.02 max wt. % S with balance being Fe;

ii) an inner tube layer being formed from an alumina forming bulk alloy comprising 6.19 to 6.33 wt. % of Al, 20.97 to 21.00 wt. % Cr, 0.41 to 0.43 wt. % Si, 38.7 to 38.9 wt. % Fe and 0.1 wt. % to 30.0 wt. % of at least one intermetallic precipitate chosen from Ni3Al, NiAl, sigma-phase, and combinations thereof with balance being Ni, wherein the inner tube layer is formed by plasma powder welding the alumina forming bulk alloy on an inner surface of the outer tube layer; and iii) an oxide layer formed on a surface of the inner tube layer, wherein the oxide layer comprises alumina.

* * * * *